(12) United States Patent
Jin (10) Patent No.: US 9,600,712 B2
(45) Date of Patent: Mar. 21, 2017

(54) METHOD AND APPARATUS FOR PROCESSING DIGITAL IMAGES USING FACE RECOGNITION

(71) Applicant: SAMSUNG ELECTRONICS CO., LTD., Suwon-si, Gyeonggi-do (KR)

(72) Inventor: Hyun-sung Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 14/467,456

(22) Filed: Aug. 25, 2014

(65) Prior Publication Data

US 2015/0063636 A1  Mar. 5, 2015

(30) Foreign Application Priority Data

Aug. 30, 2013 (KR) ......................... 10-2013-0104516

(51) Int. Cl.
| | | |
|---|---|---|
| *G06K 9/00* | (2006.01) | |
| *G06T 11/60* | (2006.01) | |
| *H04N 5/232* | (2006.01) | |
| *H04N 5/262* | (2006.01) | |
| *G06K 9/62* | (2006.01) | |

(52) U.S. Cl.
CPC ..... *G06K 9/00228* (2013.01); *G06K 9/00261* (2013.01); *G06K 9/00288* (2013.01); *G06K 9/6289* (2013.01); *G06T 11/60* (2013.01); *H04N 5/23219* (2013.01); *H04N 5/23222* (2013.01); *H04N 5/2621* (2013.01)

(58) Field of Classification Search
CPC ............... G06F 17/30247; G06F 17/30; G06F 17/30613; G06K 9/00288; G06K 9/036
See application file for complete search history.

(56) References Cited

U.S. PATENT DOCUMENTS

| | | | | |
|---|---|---|---|---|
| 6,088,040 A * | 7/2000 | Oda | ........................ | G06T 13/40 345/441 |
| 2011/0063440 A1* | 3/2011 | Neustaedter | ........... | H04N 5/144 348/143 |
| 2011/0304774 A1* | 12/2011 | Latta | ................. | G06F 17/30784 348/699 |
| 2013/0279811 A1* | 10/2013 | Cheng | ................. | G06K 9/00228 382/195 |
| 2014/0029859 A1* | 1/2014 | Libin | ................. | G06K 9/00221 382/224 |
| 2014/0270370 A1* | 9/2014 | Saito | ................. | G06K 9/00288 382/103 |

FOREIGN PATENT DOCUMENTS

KR    1020130055444 A    5/2013

* cited by examiner

*Primary Examiner* — Bhavesh Mehta
*Assistant Examiner* — Menatoallah Youssef
(74) *Attorney, Agent, or Firm* — Drinker Biddle & Reath LLP (57) ABSTRACT

A method and apparatus for processing digital images are provided. The method includes: recognizing faces from a plurality of images of a jumping subject; determining respective priorities for the plurality of images of the jumping subject, wherein an index of the priorities is based on face recognition information; and aligning the plurality of images of the jumping subject based on the priorities.

20 Claims, 8 Drawing Sheets

METHOD AND APPARATUS FOR PROCESSING DIGITAL IMAGES USING FACE RECOGNITION

CROSS-REFERENCE TO RELATED PATENT APPLICATIONS

This application claims the priority benefit of Korean Patent Application No. 10-2013-0104516, filed on Aug. 30, 2013, in the Korean Intellectual Property Office, the disclosure of which is incorporated herein in its entirety by reference.

BACKGROUND

1. Field

One or more embodiments of the present disclosure relate to a method and apparatus for processing digital images.

2. Related Art

When an image of a jumping subject is intended to be captured, a preferred image of the jumping subject may be included in a plurality of images that are captured through fast continuous shooting. As many images are randomly captured at high speed, the possibility of capturing a preferred image of a jumping subject is increased.

However, as the speed of continuous shooting has increased due to recent technological developments, users' inconvenience in photographing a jumping subject has also increased as resources consumed by a device with a continuous shooting function increase based on the increased continuous shooting speed, a plurality of images have to be compared with each other, and the preferred image of a jumping subject has to be selected.

SUMMARY

One or more embodiments of the present disclosure include a method of processing images, whereby a plurality of images of a jumping subject captured by fast continuous shooting are aligned so as to select a preferred image of the jumping subject.

Additional embodiments will be set forth in part in the description which follows and, in part, will be apparent from the description, or may be learned by practice of the presented embodiments.

According to one or more embodiments, a method of processing digital images includes: recognizing faces from a plurality of images of a jumping subject; determining respective priorities for the plurality of images of the jumping subject, wherein an index of the priorities is based on face recognition information; and aligning the plurality of images of the jumping subject based on the priorities.

The aligning of the plurality of images of the jumping subject may include deleting images of the plurality of images of the jumping subject other than a predetermined number of images of the plurality of images of the jumping subject in a priority descending order.

The method may further include: analyzing a priority selection reference preferred by a user based on face recognition information of images of the plurality of images of the jumping subject selected by the user from the plurality of images of the jumping subject; and storing a result of analyzing of the priority selection reference in a database.

The determining of the priorities may include determining respective priorities for the plurality of images of the jumping subject based on the priority selection reference extracted from the database.

The priority selection reference may include weights for statistical values of the face recognition information.

The face recognition information may include one or more of positions of the faces, the number of the faces, or facial expressions of the faces.

The method may further include generating, based on the user's image synthesis request, a synthesized image obtained by synthesizing images of the plurality of images of the jumping subject having the highest priorities based on persons within the images.

The recognizing of the faces may include predicting positions of omitted faces if omission of the faces is detected.

The positions of the omitted faces may be predicted using a shutter speed and gravitational acceleration of an image sensor.

The determining of the priorities may include determining respective priorities for the plurality of images of the jumping subject based on the priority selection reference input by the user.

According to one or more embodiments, an apparatus for processing digital images includes: a face recognition unit that recognizes faces from a plurality of images of a jumping subject; a priority determination unit that determines respective priorities for the plurality of images of the jumping subject, wherein an index of the priorities is based on face recognition information; and an image alignment unit that aligns the plurality of images of the jumping subject based on the priorities.

The image alignment unit may delete images of the plurality of images of the jumping subject other than a predetermined number of images of the plurality of images of the jumping subject in a priority descending order.

The priority determination unit may analyze a priority selection reference preferred by a user based on face recognition information of images of the plurality of images of the jumping subject selected by the user from the plurality of images of the jumping subject and stores a result of analyzing the priority selection reference in a database.

The priority determination unit may determine respective priorities for the plurality of images of the jumping subject based on the priority selection reference extracted from the database.

The priority selection reference may include weights for statistical values of the face recognition information.

The face recognition information may include one or more of positions of the faces, the number of the faces, or facial expressions of the faces.

The apparatus may further include a synthesization unit that generates, based on the user's image synthesis request, a synthesized image obtained by synthesizing images of the plurality of images of the jumping subject having the highest priorities based on persons within the images.

The face recognition unit may predict positions of omitted faces if omission of the faces is detected.

The positions of the omitted faces may be predicted based on shutter speed and gravitational acceleration of an image sensor.

The priority determination unit may determine respective priorities for the plurality of images of the jumping subject based on the priority selection reference input by the user.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

As the invention allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the invention are encompassed in the present disclosure. In the description herein, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Methods and apparatuses for processing digital images according to various embodiments will be described below in more detail with reference to the accompanying drawings. The components that are the same or are in correspondence are indicated by the same reference numeral regardless of the figure number and redundant explanations thereof are omitted. As used herein, the term "and/or" includes any and all combinations of one or more of the associated listed items. Expressions such as "at least one of," when preceding a list of elements, modify the entire list of elements and do not modify the individual elements of the list.

Figure 1:
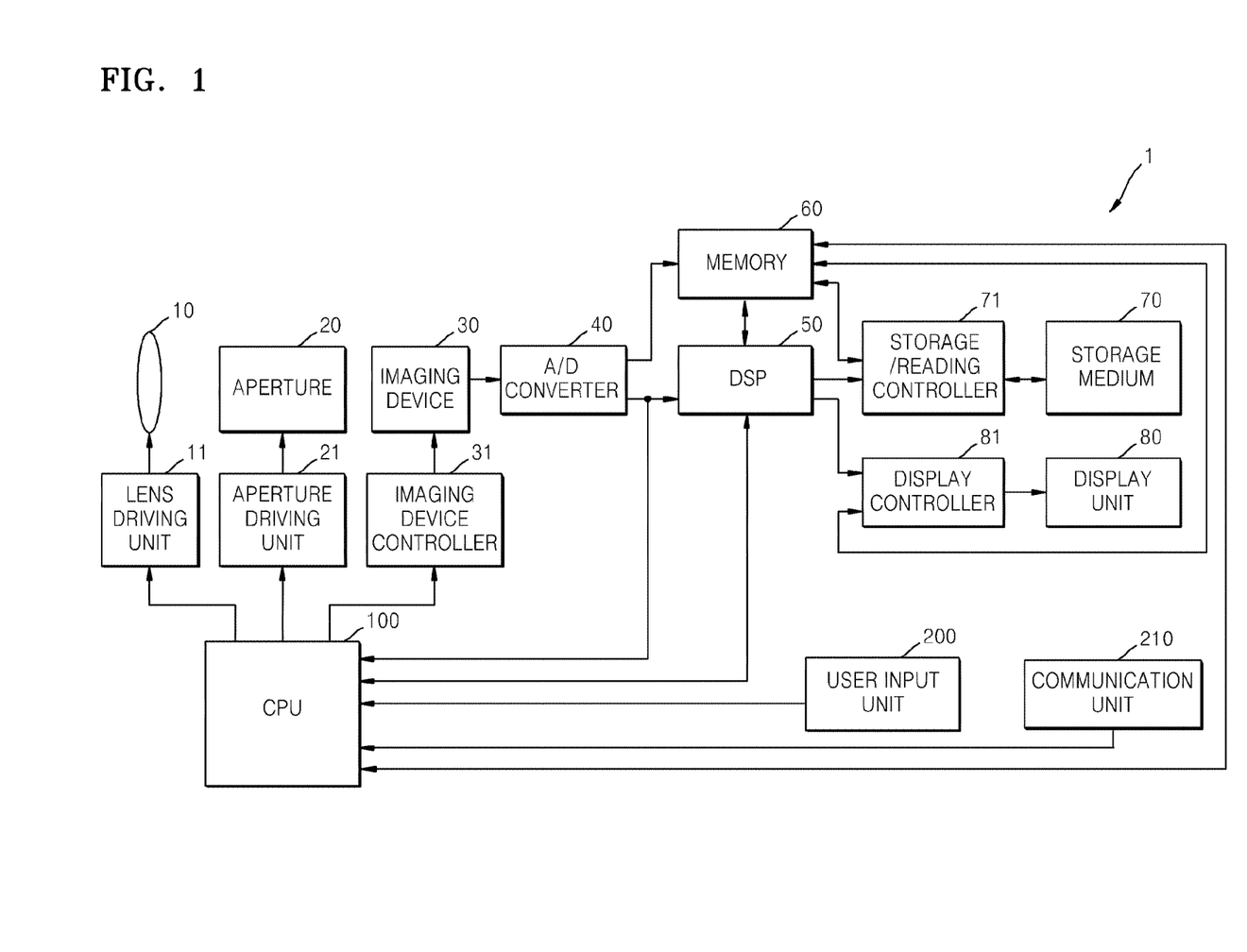
FIG. 1 is a block diagram schematically illustrating an apparatus for processing digital images according to an embodiment.

FIG. 1 is a block diagram schematically illustrating an electronic apparatus 1 for processing digital images according to an embodiment.

The electronic apparatus 1 for processing digital images may be a digital camera, a mobile phone, a camcorder, a surveillance camera, a robot, a personal digital assistant (PDA), a personal multimedia player (PMP), or a personal computer (PC).

Various operations of the electronic apparatus 1 are controlled by a central processing unit (CPU) 100. The electronic apparatus 1 includes a user input unit 200 having one or more key or inputs for generating electrical signals based on inputs from a user. The electrical signals from the user input unit 200 are transmitted to the CPU 100 so that the CPU 100 may control the electronic apparatus 1 based on the electrical signals (e.g., based on the user's input).

In an image capturing mode, the CPU 100 controls a lens driving unit 11, an aperture driving unit 21, and an imaging device controller 31 based on 1) control signals that are automatically generated based on image signals that are input in real-time or 2) control signals that are manually input by a user to the CPU 100. Thus, a position of a lens 10, a degree of opening of an aperture 20, or sensitivity of an imaging device 30 are controlled.

The lens 10 may include at least one lens, such as a zooming lens for controlling a viewing angle to be decreased or increased based on a focal length and a focusing lens for focusing a subject. The aperture 20 may adjust an amount of light received by the imaging device 30. The imaging device 30 generates data regarding images from input light, and an analog to digital (A/D) converter 40 converts analog data output from the imaging device 30 into digital data. In some embodiments, the A/D converter 40 may be omitted, depending on characteristics of the imaging device 30.

Data from the imaging device 30 may be input to a digital signal processor (DSP) 50 via memory 60 or may also be input to the CPU 100.

The memory 60 may perform a function of storing a program for processing and controlling the DSP 50 and may also perform a function of temporarily storing input/output data, for example, a phone book, a message, a still image, or a moving picture image.

The memory 60 may be at least one type storing medium selected from the group consisting of flash memory type memory, hard disk type memory, multimedia card micro type memory, card type memory (for example, SD or XD memory), random access memory (RAM), static random access memory (SRAM), read-only memory (ROM), electrically erasable programmable read-only memory (EEPROM), programmable read-only memory (PROM), magnetic memory, a magnetic disk, and an optical disk. Also, the electronic apparatus 1 may operate a web storage that performs the storing function of the memory 60 over the Internet.

The electronic apparatus 1 includes the DSP 50 that processes input image signals and controls elements based on the image signals or externally-input signals.

The DSP 50 is electrically connected to the lens driving unit 11, the aperture driving unit 21, and the imaging device controller 31, and a display unit controller 81 and performs a function of exchanging control signals with the elements so as to control an operation of each of the elements or a function of processing data. The DSP 50 may be implemented with one or more microchips or a circuit board including microchips. The elements included in the DSP 50 may be implemented by software or circuits embedded in the DSP 50 or a combination thereof.

The DSP 50 may perform image signal processing and may control the elements based on results of image signal processing. Also, the DSP 50 may control the elements based on the user's control signals input by the user input unit 200. Also, the DSP 50 controls the elements to display live view images. The control operation of the DSP 50 will be described below.

The DSP 50 may perform image signal processing, such as gamma correction, color filter array interpolation, color matrix, color correction, or color enhancement, so as to convert the image signals based on the user's wishes. Also, when a function of auto white balance or auto exposure is set in the DSP 50, the DSP 50 may perform an auto white balance or auto exposure algorithm. Also, the DSP 50 may adjust the size of image data using a scaler and may form an image file having a predetermined format. Also, the DSP 50 may decompress the image file. A compression format of an image may be a reversible or irreversible format.

The image data output from the DSP 50 is transmitted to the display controller 81 via the memory 60 or directly to the display controller 81. The display controller 81 controls a display unit 80 and displays an image on the display unit 80. The image data output from the DSP 50 is input to a storage/reading controller 71 via the memory 60 or directly to the storage/reading controller 71. The storage/reading controller 71 stores the image data in a storage medium 70 based on signals from the user or automatically.

The storage/reading controller 71 may read data regarding an image from the image file stored in the storage medium 70 and may input the read data to the display controller 81 via the memory or via another path so that the image may be displayed on the display unit 80. The storage medium 70 may be detachable or permanently mounted on the electronic apparatus 1 for processing digital images.

The user input unit 200 generates input data for controlling an operation of the electronic apparatus 1 for processing digital images. The user input unit 200 may include one or more of a key pad, a dome switch, a touch pad (a contact capacitance overlay type, a pressure resistance film type, an infrared sensing type, a surface ultrasonic wave conduction type, an integral tension measurement type, or a piezo effect type), a jog wheel, or a jog switch. In particular, when the touch pad is layered (e.g., integrally formed) with the display unit 80, the touch pad may be referred to as a touch screen. In an embodiment, the user may select continuous photographing using the user input unit 200. The user may input a priority selection reference for aligning an image of a jumping subject using the user input unit 200. Also, the user may request subject synthesis of a plurality of images of a jumping subject from the user input unit 200.

The display unit 80 may include a liquid crystal display (LCD), an organic light emitting display (OLED), an electrophoresis display (EPD), a flexible display, or a three-dimensional (3D) display.

When the display unit 80 and the touch pad are layered with each other to form a touch screen, the display unit 80 may be used as an input unit, in addition to an output unit. The touch screen may be configured to detect a touch input pressure in addition to a touched area. Also, the touch screen may be configured to detect a proximity touch in addition to a real-touch.

In this way, the electronic apparatus 1 generates image data from light that passes through the lens 10 and is incident on the imaging device 30 and stores a digital image file that has image data in the storage medium 70.

Figure 2:
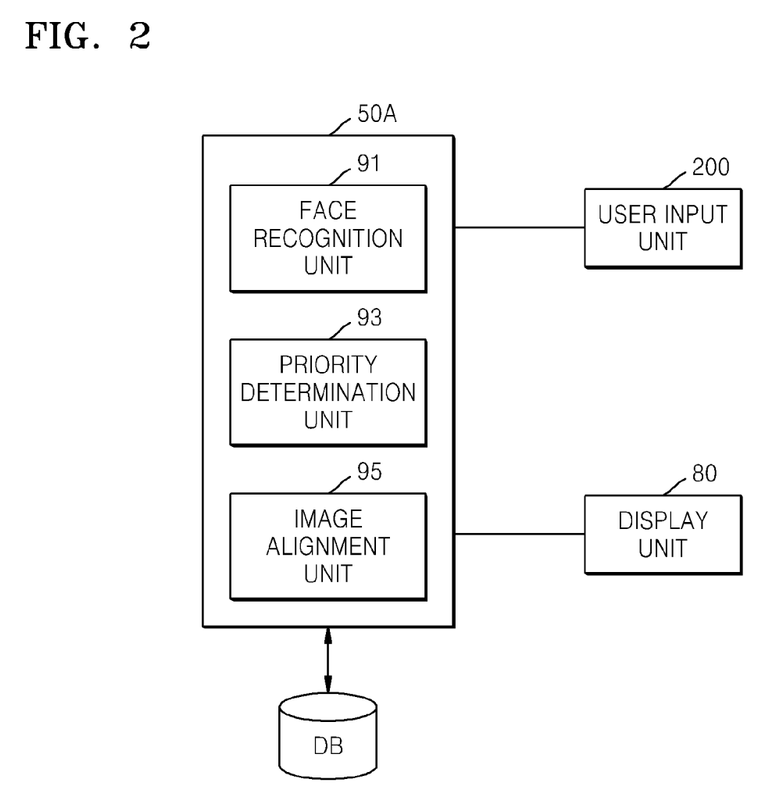
FIG. 2 is a block diagram schematically illustrating a digital signal processor (DSP) of the apparatus for processing digital images illustrated in FIG. 1, according to an embodiment.

FIG. 2 is a block diagram schematically illustrating a DSP 50A of the electronic apparatus 1 illustrated in FIG. 1, according to an embodiment.

Referring to FIG. 2, the DSP 50A may include a face recognition unit 91, a priority determination unit 93, and an image alignment unit 95.

The face recognition unit 91 may recognize faces from a plurality of images. The plurality of images may be images that are continuously captured at a predetermined frame rate using the imaging device 30 of the electronic apparatus 1 and may be images stored in the storage medium 70. The plurality of images may be manually input by the user's manipulation or may be input from a web server via a network (not shown). In the current embodiment, a plurality of images of the jumping subject that are obtained by continuously capturing a scene of at least one person jumping, will be described as an example.

The face recognition unit 91 may recognize a face by detecting a facial region from a reduced image by applying a thumbnail to an original image of the jumping subject, i.e., a thumbnail image that is compressed based on the size of a visible region of a screen of the display unit 80. Thus, power consumption and processing time delay that occur when face recognition is performed on an image with full resolution may be minimized, and thus, the facial region may be quickly detected.

The face recognition unit 91 may extract face recognition information through facial region detection. The face recognition information may include at least one of various pieces of information, such as positions of faces within each image of the jumping subject, the number of faces and facial expressions of the faces within each image of the jumping subject (or subjects). The positions of faces may be calculated based on a bottom surface of the image.

For images captured using fast continuous photographing, the face recognition unit 91 may detect facial regions in the images by predicting positions of faces based on a shutter speed and gravitational acceleration (e.g., as the subject jumps and returns to the ground) when faces are omitted from the plurality of images of the jumping subject. Thus, the face recognition unit 91 may extract the face recognition information more precisely. The face recognition unit 91 may detect omission of a face from a current image of the plurality of images of the jumping subject based on face recognition information of the previous image or next image of the plurality of images of the jumping subject in terms of time.

There are many facial region detection techniques and algorithms that may be used in facial detection according to the current embodiment. For example, the facial region may be detected using a movement vector technique, a feature point detection technique, or an Adaboost learning technique.

The priority determination unit 93 may determine respective priorities for the plurality of images of the jumping subject based on the priority selection reference input by the user. The priority selection reference may be changed by the user.

The priority selection reference may be determined by the user's input. In this case, the display unit 80 may display menu items generated based on internal control signals or the control signals input by the user input unit 200. When the user selects continuous photographing or capturing of images of the jumping subject using the user input unit 200, the display unit 80 may display the menu items through which a plurality of priority selection references may be directly or indirectly selected by the user. The display unit 80 may display the menu items using visual or auditory methods (or a combination thereof) so that the user may select the plurality of priority selection references. The priority determination unit 93 may determine respective priorities for the plurality of images of the jumping subject based on the user's priority selection reference.

The priority selection reference may be determined through analysis of the plurality of images of the jumping subject selected by the user. In this case, the priority determination unit 93 may analyze face recognition information regarding images of the jumping subject selected by the user from the plurality of images of the jumping subject where the plurality of images are aligned (e.g., arranged in a sequence) based on a priority selection reference. The priority determination unit 93 may extract a priority selection reference preferred by the user through analysis of the images of the jumping subject, thereby making a database DB using the extracted priority selection reference. The priority determination unit 93 may store the result of analysis in the database DB and may update the database DB whenever there is the user's selection of the images of the jumping subject. The database DB may be a memory or storage medium that is separate from the storage medium 70. The priority determination unit 93 may search the database DB for a recent priority selection reference preferred by the user, thereby determining respective priorities for the plurality of images of the jumping subject based on the searched priority selection reference.

An index for the priorities may be based on face recognition information. The priorities may be determined from statistical values of the face recognition information. The statistical values of the face recognition information may include, for example, an average of positions of faces within the images of the jumping subject, a degree of a deviation of the average of positions of faces within the images of the jumping subject, and the number of faces.

The priority selection reference for the images of the jumping subject may be, for example, at least one selected from a plurality of selection references, such as an image of the jumping subject having the largest average of positions of faces, an image of the jumping subject having the smallest deviation of average of positions of faces, and an image of the jumping subject having the largest number of faces. The image of the jumping subject having the largest average of positions of faces may be an image captured when heights of all jumping persons is the highest. The image of the jumping subject having the smallest deviation of average of positions of faces may be an image captured when persons are at the same height. The image of the jumping subject having the largest number of faces may be an image in which all persons in the image are captured without smearing or blurring. The current embodiment is not limited to the above-described priority selection reference, and the priority selection reference may be set in various ways based on a reference preferred by the user for a preferred image of the jumping subject.

The priority selection reference may be weights for the statistical values of the face recognition information. For example, the priority determination unit 93 may determine respective priorities for the plurality of images of the jumping subject based on three priority selection references by assigning a weight of 0.5 to the average of positions of faces, by assigning a weight of 0.3 to the degree of the deviation of the average of positions of faces, and by assigning a weight of 0.2 to the number of faces.

Figure 3A:
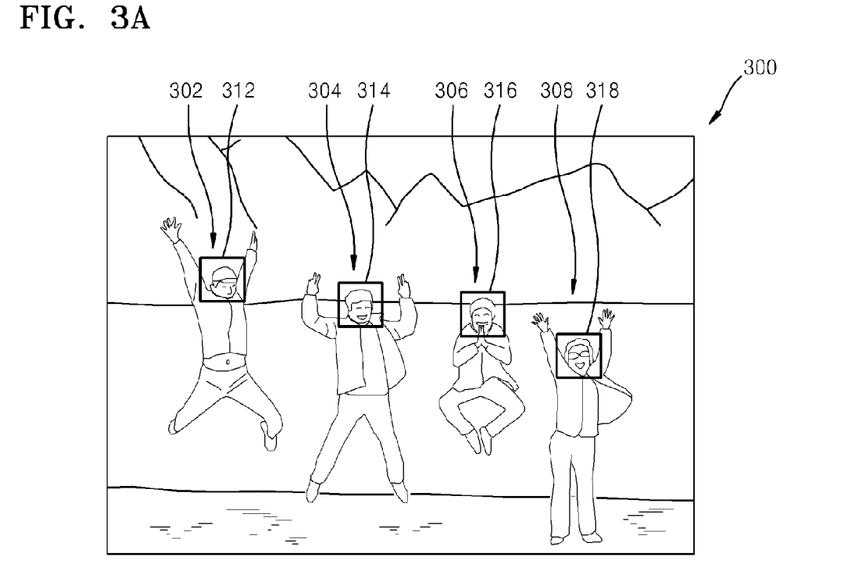
FIGS. 3A and 3B are examples showing results of face recognition in an image of a jumping subject.
Figure 3B:
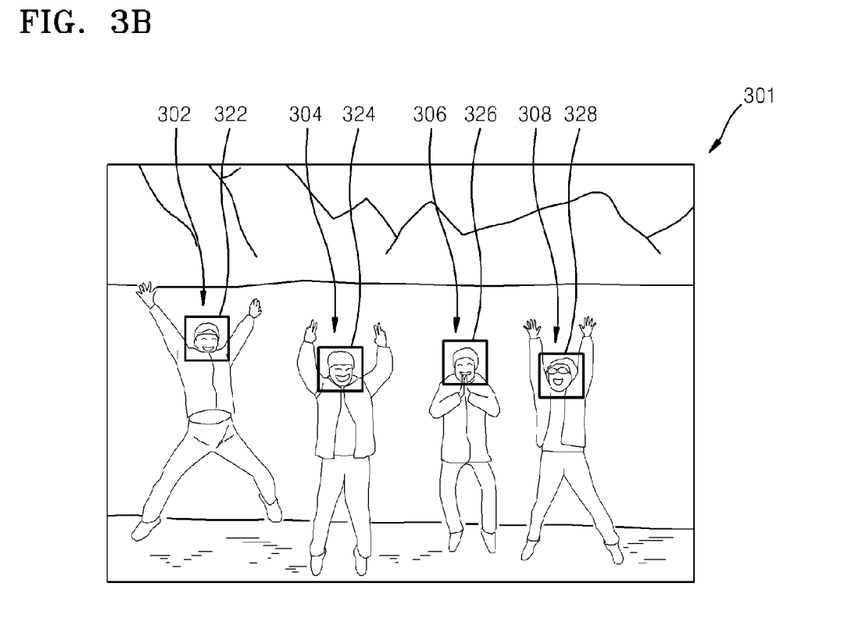

FIGS. 3A and 3B are examples of images 300 and 301 showing results of face recognition in an image of a jumping subject. In FIG. 3A, face detection regions of image 300 are indicated by boxes 312, 314, 316, and 318 for subjects 302, 304, 306, and 308, respectively. In FIG. 3B, face detection regions of image 301 are indicated by boxes 322, 324, 326, and 328 for the subjects 302, 304, 306, and 308, respectively. When face recognition is performed on each subject (e.g., each person), it may be easily checked which person is jumping at a higher height.

The priority determination unit 93 may determine a priority of image 301 of FIG. 3B to be higher than that of image 300 of FIG. 3A when the average of positions of faces in image 301 is higher than that of image 300, a degree of the deviation of positions of faces in image 301 is smaller than that of image 300 and all of the subjects are recognized.

An image alignment unit 95 may align the plurality of images of the jumping subject based on the priority (e.g., the priority determined in each image of the plurality of images based on the predetermined priority selection reference, or the priority selection reference preferred by the user who searches the database DB). The image alignment unit 95 may align the plurality of images in a priority descending order based on the priority, thereby displaying the aligned images of the plurality of images on the display unit 80.

The display unit 80 may display the plurality of images as thumbnail images on a screen based on the priority. The user may select at least one from the plurality of images of the jumping subject aligned on the display unit 80 using the user input unit 200. The result of the user's selection of the image from the plurality of images of the jumping subject may be analyzed by the priority determination unit 93, and the result of analysis may be stored in the database DB.

The image alignment unit 95 may display only a predetermined number of images from the plurality of images of the jumping subject determined in a priority descending order on the display unit 80 and may delete or omit the remaining images of the plurality of images of the jumping subject. Thus, the user may quickly select a preferred image of the jumping subject. Alternatively, the image alignment unit 95 may cause only the selected images of the plurality of images of the jumping subject to remain on the display unit 80 and may delete or omit the other images of the plurality of images of the jumping subject. In this case, the display unit 80 may display a menu item that asks the user to delete one or more images.

The image alignment unit 95 may align and display the image 301 in an earlier position (e.g., appearing earlier in a sequence of images) than that of image 300 of the display unit 80 when a priority of the image 301 is higher than that of image 300.

Figure 4:
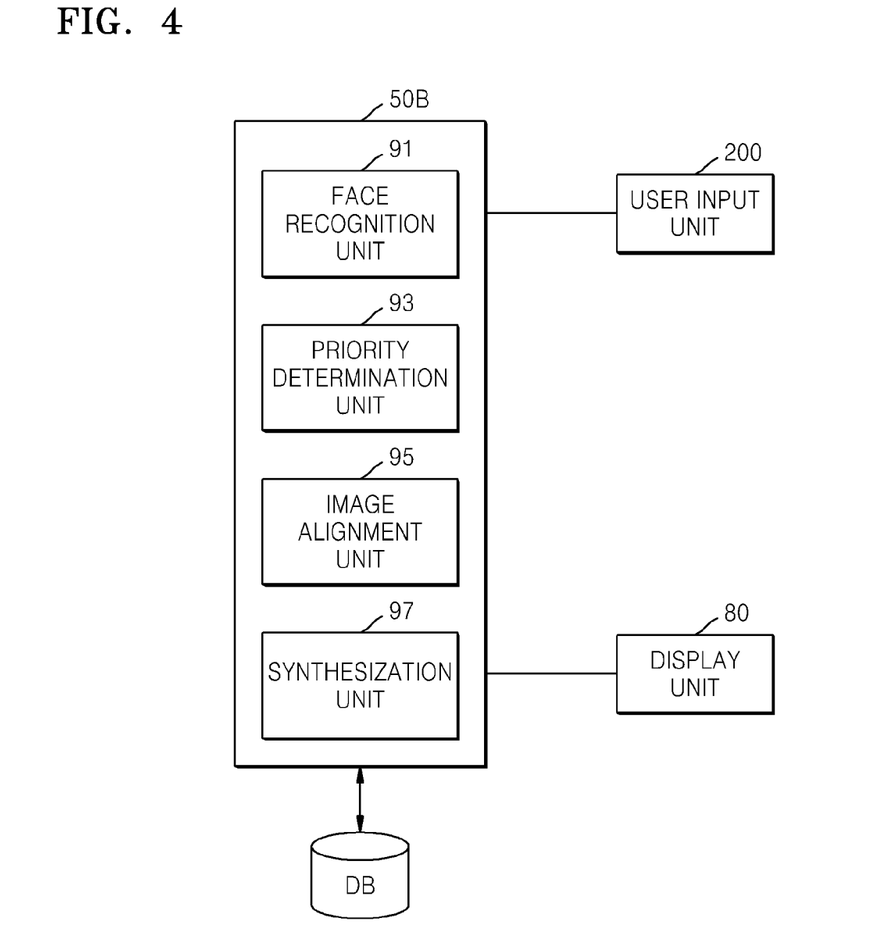
FIG. 4 is a block diagram schematically illustrating a DSP of the apparatus for processing digital images of FIG. 1, according to another embodiment.

FIG. 4 is a block diagram schematically illustrating a DSP 50B of the electronic apparatus 1 of FIG. 1, according to another embodiment.

Referring to FIG. 4, the DSP 50B may include a face recognition unit 91, a priority determination unit 93, an image alignment unit 95, and a synthesization unit 97. Hereinafter, detailed descriptions of like elements that are the same as those of FIG. 2 will be omitted.

The face recognition unit 91 may recognize faces from each of a plurality of images of a jumping subject that are continuously captured and input.

The face recognition unit 91 may detect facial regions from a thumbnail image, thereby quickly detecting the facial regions. When a face is omitted from the images of the jumping subject owing to continuous photographing, the position of the omitted face may be predicted using a shutter speed and acceleration speed so that the facial image can be detected.

The face recognition unit 91 may extract face recognition information through face recognition detection. The face recognition information may include at least one of various pieces of information, such as positions of faces within each image of the jumping subject or the number of faces within each image of the jumping subject.

The priority determination unit 93 may determine respective priorities for the plurality of images of the jumping subject based on a predetermined priority selection reference. The priority selection reference may be determined by the user's input. Alternatively, the priority selection reference may be determined through analysis of the image of the jumping subject selected by the user. The priority determination unit 93 may extract the priority selection reference preferred by the user through analysis of the image of the jumping subject and may make a database DB from the extracted priority selection reference. The priority determination unit 93 may store the result of analysis in the database DB and may update the database DB whenever there is the user's selection of the image of the jumping subject. The priority determination unit 93 may search the database DB for a recent priority selection reference preferred by the user, thereby determining respective priorities for the plurality of images of the jumping subject based on the searched priority selection reference.

The image alignment unit 95 may align a plurality of images of the jumping subject based on the priority (e.g., the determined in each image of the jumping subject based on the predetermined priority selection reference or the priority selection reference preferred by the user who searches the database DB). The image alignment unit 95 may align the plurality of images in the priority descending order based on the priority, thereby displaying the aligned images of the jumping subject on the display unit 80. The user may select at least one image from the plurality of images of the jumping subject aligned on the display unit 80 using the user input unit 200. The image alignment unit 95 may display only a predetermined number of images of the jumping subject in the priority descending order on the display unit 80 and may delete or omit the other images of the jumping subject.

As more images are captured within a short time, it is more likely that a preferred image of the jumping subject may be obtained. Thus, when a plurality of persons jump at once, a high-performance camera may capture several images or several tens of images per second at high speed. In order to check whether the captured images of the jumping subject are appropriate, the images of the jumping subject need to be checked by a user, one by one. If the images of the jumping subject are not satisfactory, images of all persons need to be re-captured. In this case, a waiting time before re-capturing is attempted increases as the number of times of photographing is increased.

In the current embodiment, when the user is not satisfied with the images of the jumping subject aligned on the display unit 80 as a preferred image of the jumping subject, the captured images of the jumping subject may be synthesized using the user input unit 200 without performing re-photographing.

The priority determination unit 93 may determine respective priorities for the plurality of images of the jumping subject based on persons within the images. Face recognition information of persons may be individually evaluated, and the respective priorities for the plurality of images of the jumping subject may be determined based on the persons within the image so that the images having high priorities may be different from each other based on a specific person. For example, a first image 501 from a plurality of images (e.g., image 501 and image 502 of FIGS. 5A and 5B) of jumping subject (e.g., a plurality of persons 511, 512, 513, and 514) may have a highest priority with respect to the person 511, and the image 502 may have a highest priority with respect to the person 514.

The synthesization unit 97 may extract persons from an image of the jumping subject having the highest priority based on the persons and may generate a synthesized image that is synthesized with the extracted persons and the same background. Thus, a preferred image of the jumping subject may be obtained without waiting until re-photographing.

Figure 5A:
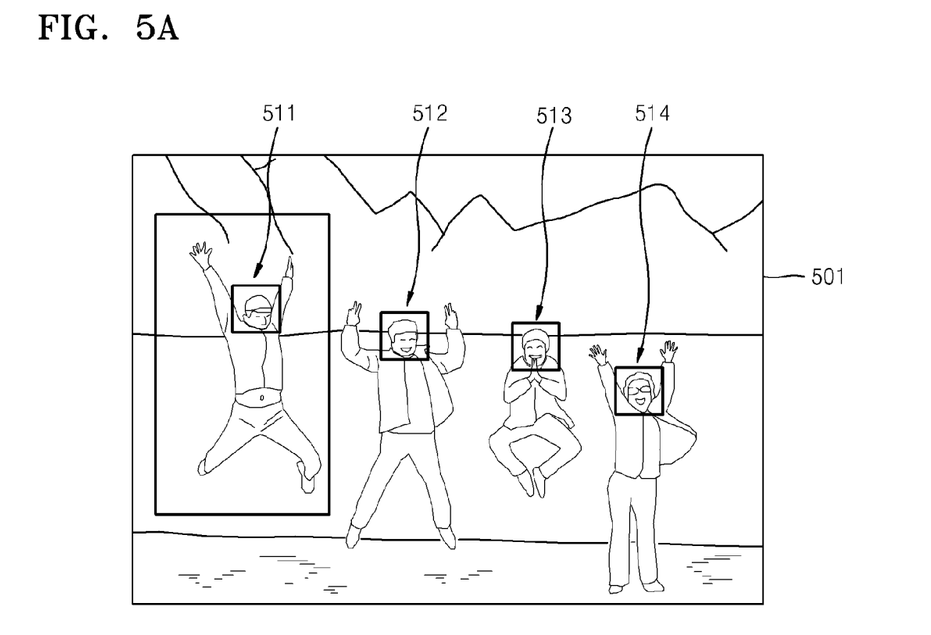
FIGS. 5A, 5B, and 5C are diagrams in which images of a jumping subject are synthesized.
Figure 5B:
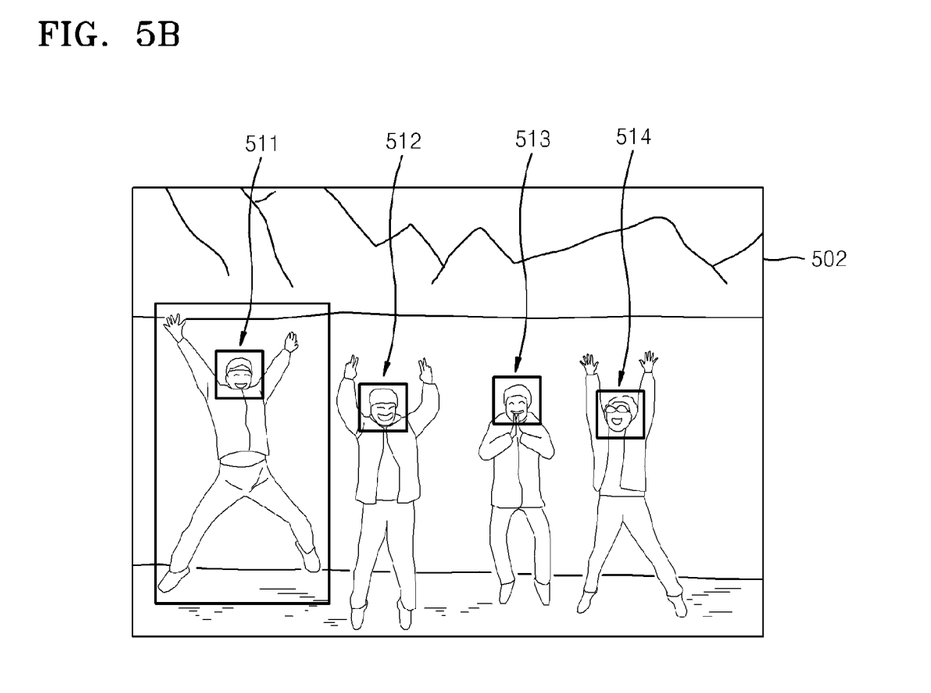
Figure 5C:
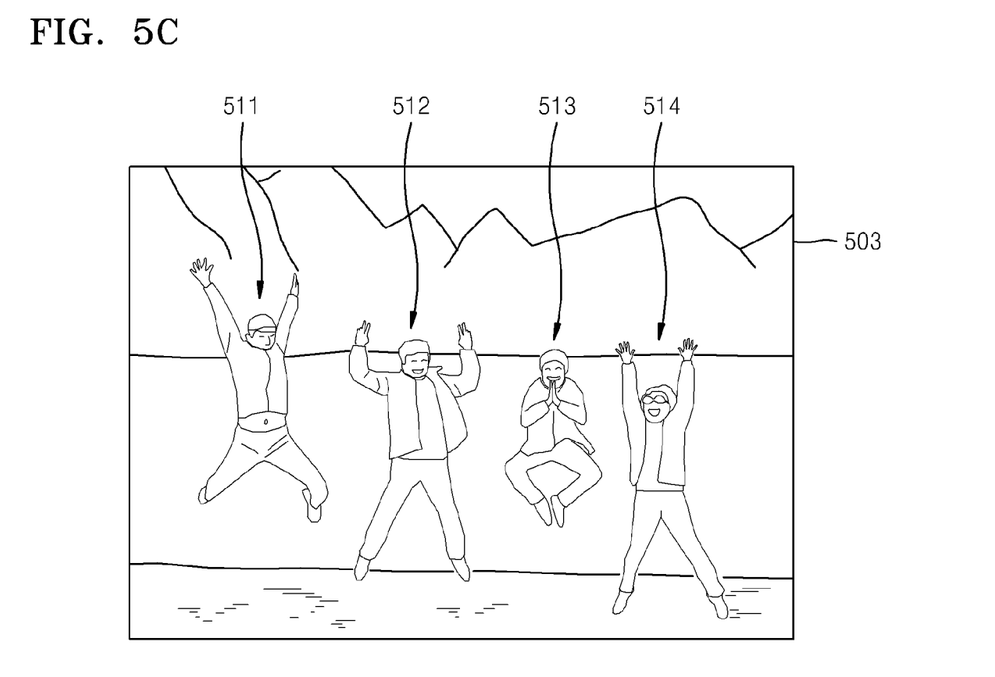

FIGS. 5A through 5C show images 501, 502, and 503 in which images of the jumping subject are synthesized by the synthesization unit 97.

In FIGS. 5A and 5B, a person 511 is shown as selected using a large box, and face recognition information regarding the person 511 is individually evaluated from each image of the jumping subject. An image 501 illustrated in FIG. 5A is an image having the highest priority with respect to the person 511, a person 512, and a person 513, and an image 502 illustrated in FIG. 5B is an image having the highest priority with respect to the person 514.

As illustrated in FIG. 5C, the synthesization unit 97 may generate a synthesized image 503 that is obtained by synthesizing, based on the user's image synthesis request, the person 511, the person 512, and the person 513 of the image 501 and the person 514 of the image 502.

Figure 6:
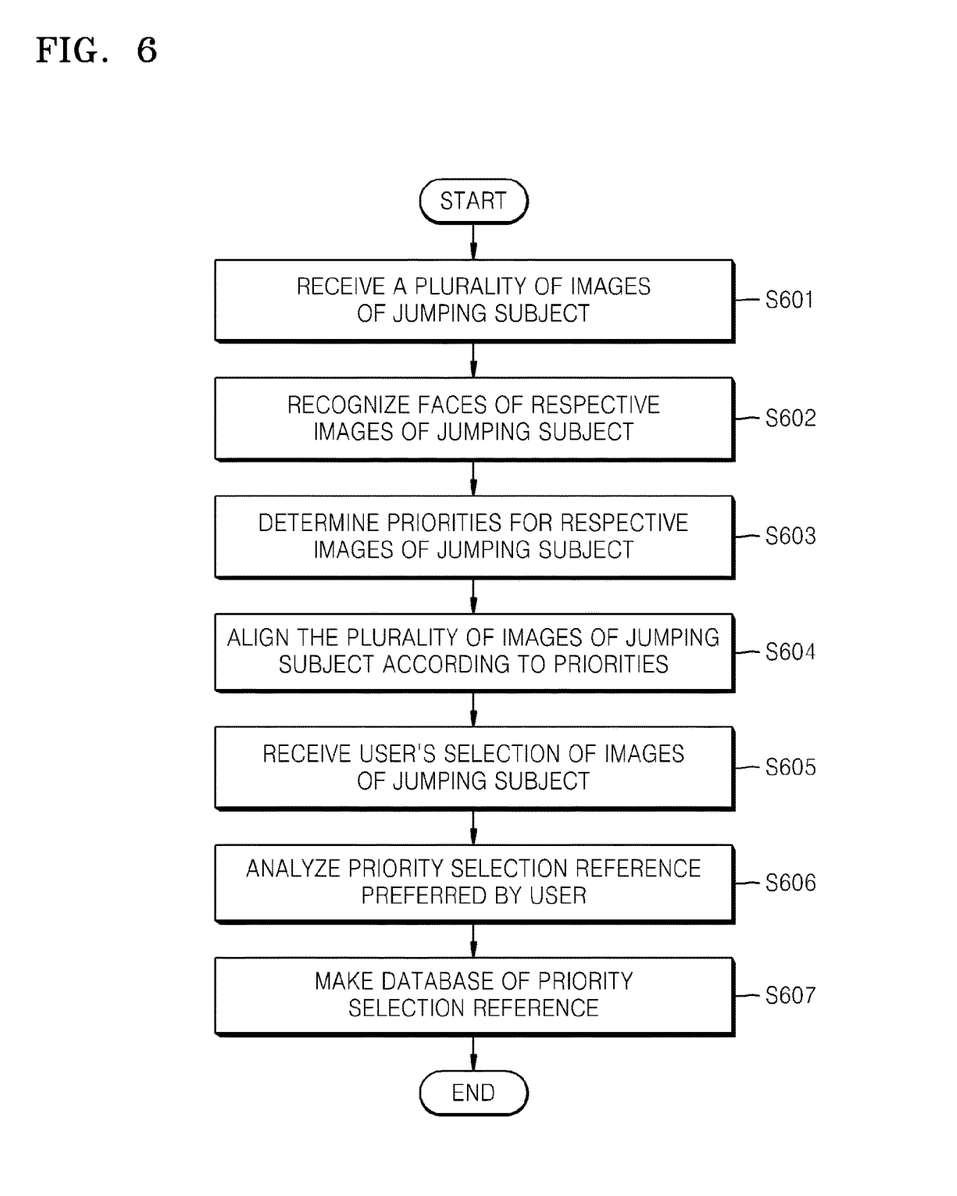
FIG. 6 is a flowchart illustrating a method of processing digital images, whereby the images of a jumping subject are aligned, according to an embodiment.

FIG. 6 is a flowchart illustrating a method of processing digital images, whereby the images of the jumping subject are aligned according to an embodiment.

Referring to FIG. 6, an apparatus for processing digital images (e.g., electronic apparatus 1) may receive a plurality of images of a jumping subject (S601) and may recognize faces of subjects from the plurality of images of the jumping subject (S602). When faces are omitted from one or more of the plurality of images of the jumping subject (e.g., not recognized in a subsequent image), the electronic apparatus 1 may detect a facial region by predicting positions of the omitted faces based on shutter speed (e.g., the time between the images) and acceleration of gravity. Face recognition information may be extracted by facial region detection. The face recognition information may include positions of faces and the number of faces.

The electronic apparatus 1 may determine respective priorities for the plurality of images of the jumping subject (S603) based on persons within the images. An index of the priorities may be based on face recognition information, and the priorities may be determined based on a predetermined priority selection reference. The priority selection reference may be determined through the user's input or analysis of the plurality of images of the jumping subject selected by the user.

The electronic apparatus 1 may align the plurality of images of the jumping subject based on the priorities and may display the aligned images of the jumping subject on a display unit (S604). The electronic apparatus 1 may display only a predetermined number of images of the jumping subject in the priority descending order and may delete or omit the remaining images of the jumping subject.

The electronic apparatus 1 may receive from the user an input through which at least one of the plurality of images of the jumping subject displayed on the display unit is selected (S605).

The electronic apparatus 1 may analyze a priority selection reference preferred by the user based on face recognition information of the images of the jumping subject selected by the user (S606).

The electronic apparatus 1 may store the result of analyzing the priority selection reference in the database DB and may update the database DB (S607).

When images of a jumping subject are to be captured, the electronic apparatus 1 may extract a priority selection reference preferred by the user from the database DB and may determine respective priorities for the plurality of images of the jumping subject based on the extracted priority selection reference. However, when receiving the priority selection reference from the user, the electronic apparatus 1 may determine respective priorities for the plurality of images of the jumping subject based on the input priority selection reference.

Figure 7:
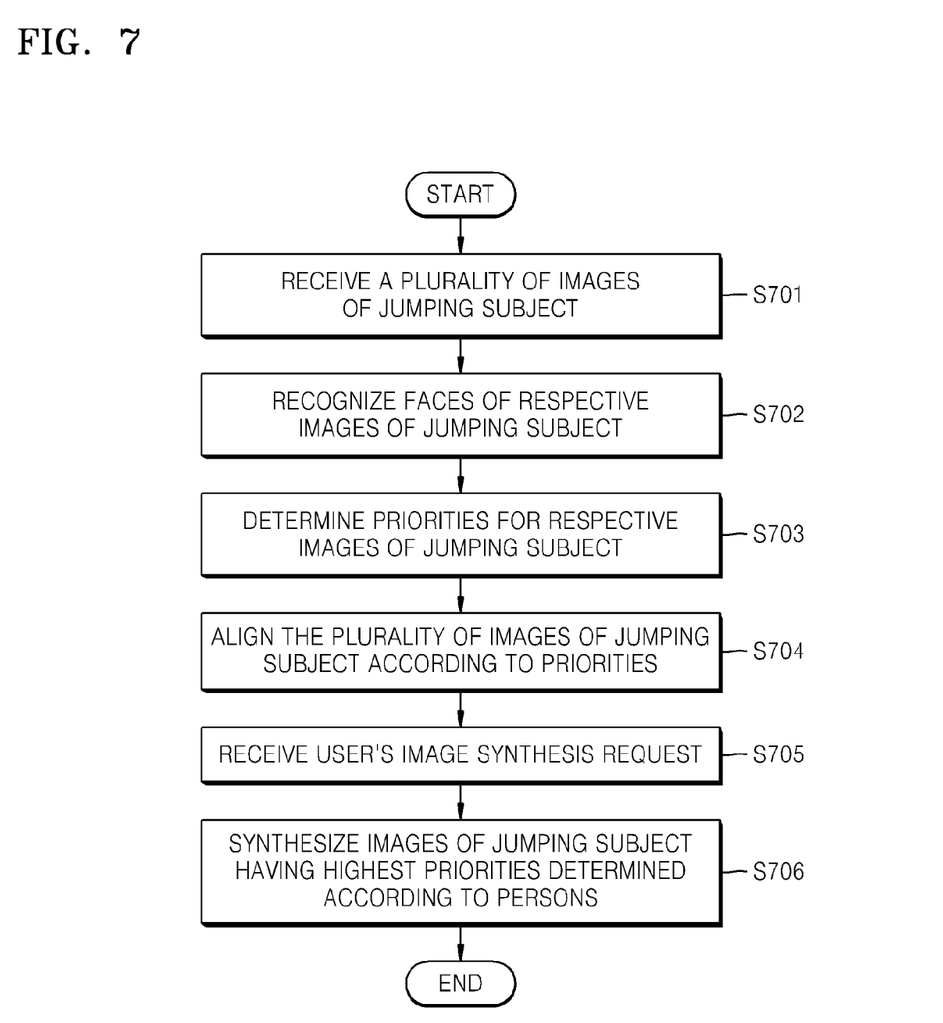
FIG. 7 is a flowchart illustrating a method of processing digital images, whereby the images of a jumping subject are aligned, according to another embodiment.

FIG. 7 is a flowchart illustrating a method of processing digital images, whereby the images of the jumping subject are aligned based on another embodiment. Hereinafter, detailed descriptions that are the same as those of the method of processing digital images will be omitted.

Referring to FIG. 7, an electronic apparatus 1 for processing digital images may receive a plurality of images of a jumping subject (S701) and may recognize faces from each of the plurality of images of the jumping subject (S702).

The electronic apparatus 1 may determine respective priorities for the plurality of images of the jumping subject (S703). An index of the priorities may be based on face recognition information, and the priorities may be determined based on a predetermined priority selection reference. The priority selection reference may be determined through the user's input or analysis of the image of the jumping subject selected by the user. Also, the electronic apparatus 1 may determine respective priorities for the plurality of images of the jumping subject based on persons (e.g., subjects) within the images. The electronic apparatus 1 may determine the priorities based on positions and facial expressions of the persons.

The electronic apparatus 1 may align the plurality of images of the jumping subject based on the determined priorities and may display the aligned images of the jumping subject on a display unit (S704). The electronic apparatus 1 may display only a predetermined number of images of the jumping subject in the priority descending order and may delete or omit the remaining images of the jumping subject.

The electronic apparatus 1 may receive from the user an input through which synthesis of the images of the jumping subject is requested (S705).

The electronic apparatus 1 may generate, based on the user's image synthesis request, a synthesized image obtained by synthesizing the images of the plurality of images of the jumping subject having the highest priorities based on the persons (S706). The electronic apparatus 1 may extract persons from the images of the plurality of images of the jumping subject having the highest priorities based on the persons and may generate a synthesized image that is synthesized with the extracted persons and the same background as a preferred image of the jumping subject.

If a method of continuously photographing is further developed due to future technological advances, a user may have difficulties in selecting the preferred image of a jumping subject and deleting the remaining images of the jumping subject. Thus, in the current embodiment, priorities are determined for the respective images of the jumping subject based on a predetermined reference so that a predetermined number of images of the jumping subject that may be a preferred image of the jumping subject may be aligned, and the remaining images of the jumping subject may be automatically deleted so that a preferred image of the jumping subject may be quickly detected.

In addition, in the current embodiment, the preferred image of the jumping subject is not automatically selected, and the user selects some images from among the images of the jumping subject aligned by list-up. Then, a selection reference of the preferred image of the jumping subject preferred by the user is extracted based on the user's selection result and may be reflected when the next list of images of the jumping subject is output.

Furthermore, in the current embodiment, when the plurality of images of the jumping subject are not satisfactory, the captured images of the jumping subject may be synthesized and re-edited so that a preferred image of the jumping subject may be provided.

As described above, according to the one or more of the above embodiments, a plurality of images of a jumping subject captured by fast continuous shooting are aligned according to priorities so that a preferred image of the jumping subject can be quickly and conveniently selected.

All references, including publications, patent applications, and patents, cited herein are hereby incorporated by reference to the same extent as if each reference were individually and specifically indicated to be incorporated by reference and were set forth in its entirety herein.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements.

Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

What is claimed is:

1. A method of processing digital images, the method comprising:
    recognizing faces from a plurality of images of jumping subjects, wherein the plurality of images are continuously captured at a predetermined frame rate;
    determining respective priorities for the plurality of images of the jumping subjects, wherein an index of the priorities is based on face recognition information, and wherein the priorities are based on an image of the jumping subjects having the largest average of positions of faces, an image of the jumping subjects having the smallest deviation of average of positions of faces, and an image of the jumping subjects having the largest number of faces; and
    aligning the plurality of images of the jumping subjects based on the priorities.

2. The method of claim 1, wherein the aligning of the plurality of images of the jumping subject comprises deleting images of the plurality of images of the jumping subject other than a predetermined number of images of the plurality of images of the jumping subject in a priority descending order.

3. The method of claim 1, further comprising:
    analyzing a priority selection reference preferred by a user based on face recognition information of images of the plurality of images of the jumping subject selected by the user from the plurality of images of the jumping subject; and
    storing a result of analyzing of the priority selection reference in a database.

4. The method of claim 3, wherein the determining of the priorities comprises determining respective priorities for the plurality of images of the jumping subject based on the priority selection reference extracted from the database.

5. The method of claim 3, wherein the priority selection reference includes weights for statistical values of the face recognition information.

6. The method of claim 1, wherein the face recognition information comprises one or more of positions of the faces, the number of the faces, or facial expressions of the faces.

7. The method of claim 1, further comprising generating, based on a user's image synthesis request, a synthesized image obtained by synthesizing images of the plurality of images of the jumping subject having the highest priorities based on persons within the images.

8. The method of claim 1, wherein the recognizing of the faces comprises predicting positions of omitted faces if omission of the faces is detected.

9. The method of claim 8, wherein the positions of the omitted faces are predicted using a shutter speed and gravitational acceleration of an image sensor.

10. The method of claim 1, wherein the determining of the priorities comprises determining respective priorities for the plurality of images of the jumping subject based on a priority selection reference input by a user.

11. An apparatus for processing digital images, the apparatus comprising:
    a face recognition unit that recognizes faces from a plurality of images of jumping subjects, wherein the plurality of images are continuously captured at a predetermined frame rate;
    a priority determination unit that determines respective priorities for the plurality of images of the jumping subjects, wherein an index of the priorities is based on face recognition information, and wherein the priorities are based on an image of the jumping subjects having the largest average of positions of faces, an image of the jumping subjects having the smallest deviation of average of positions of faces, and an image of the jumping subjects having the largest number of faces; and an image alignment unit that aligns the plurality of images of the jumping subjects based on the priorities.

12. The apparatus of claim 11, wherein the image alignment unit deletes images of the plurality of images of the jumping subject other than a predetermined number of images of the plurality of images of the jumping subject in a priority descending order.

13. The apparatus of claim 11, wherein the priority determination unit analyzes a priority selection reference preferred by a user based on face recognition information of images of the plurality of images of the jumping subject selected by the user from the plurality of images of the jumping subject and stores a result of analyzing the priority selection reference in a database.

14. The apparatus of claim 13, wherein the priority determination unit determines respective priorities for the plurality of images of the jumping subject based on the priority selection reference extracted from the database.

15. The apparatus of claim 14, wherein the priority selection reference includes weights for statistical values of the face recognition information.

16. The apparatus of claim 11, wherein the face recognition information comprises one or more of positions of the faces, the number of the faces, or facial expressions of the faces.

17. The apparatus of claim 11, further comprising a synthesization unit that generates, based on a user's image synthesis request, a synthesized image obtained by synthesizing images of the plurality of images of the jumping subject having the highest priorities based on persons within the images.

18. The apparatus of claim 11, wherein the face recognition unit predicts positions of omitted faces if omission of the faces is detected.

19. The apparatus of claim 18, wherein the positions of the omitted faces are predicted based on shutter speed and gravitational acceleration of an image sensor.

20. The apparatus of claim 11, wherein the priority determination unit determines respective priorities for the plurality of images of the jumping subject based on a priority selection reference input by a user.

* * * * *